(12) United States Patent
Klegraf et al.

(10) Patent No.: US 10,370,293 B2
(45) Date of Patent: Aug. 6, 2019

(54) METHOD AND SYSTEM FOR THE THERMAL TREATMENT OF DISPERSIBLE RAW MATERIAL

(71) Applicants: ThyssenKrupp Industrial Solutions AG, Essen (DE); ThyssenKrupp AG, Essen (DE)

(72) Inventors: Daniel Klegraf, Lippstadt (DE); Sebastian Frie, Münster (DE); Henning Brinkschulte, Münster (DE)

(73) Assignees: THYSSENKRUPP INDUSTRIAL SOLUTIONS AG, Essen (DE); THYSSENKRUPP AG, Essen (DE)

( * ) Notice: Subject to any disclaimer, the term of this patent is extended or adjusted under 35 U.S.C. 154(b) by 218 days.

(21) Appl. No.: 15/509,795

(22) PCT Filed: Sep. 9, 2015

(86) PCT No.: PCT/EP2015/070578
§ 371 (c)(1),
(2) Date: Mar. 8, 2017

(87) PCT Pub. No.: WO2016/038076
PCT Pub. Date: Mar. 17, 2016

(65) Prior Publication Data
US 2017/0260089 A1    Sep. 14, 2017

(30) Foreign Application Priority Data

Sep. 11, 2014   (DE) .................. 10 2014 113 127

(51) Int. Cl.
*C04B 2/10*    (2006.01)
*C04B 7/44*    (2006.01)
(Continued)

(52) U.S. Cl.
CPC .............. *C04B 7/4446* (2013.01); *F27B 7/20* (2013.01); *F27B 7/2033* (2013.01); *F27B 7/32* (2013.01);
(Continued)

(58) Field of Classification Search
USPC ......................................... 106/638, 713, 739
See application file for complete search history.

(56) References Cited

U.S. PATENT DOCUMENTS

| 6,749,681 B1 * | 6/2004 | Burdis ...................... C04B 7/36 106/739 |
| 2007/0261618 A1 * | 11/2007 | Kastingschafer ..... C04B 7/4446 110/251 |
| 2009/0305180 A1 * | 12/2009 | Altfeld .................... C04B 7/434 432/1 |

FOREIGN PATENT DOCUMENTS

| DE | 195 35 312 A1 | 3/1997 |
| DE | 10 2004 013 883 A1 | 10/2005 |

(Continued)

OTHER PUBLICATIONS

Int'l Search Report for PCT/EP2015/070578 dated Nov. 2, 2015 (dated Nov. 9, 2015).

(Continued)

*Primary Examiner* — James E McDonough
(74) *Attorney, Agent, or Firm* — thyssenkrupp North America, Inc.

(57) ABSTRACT

A method for the thermal treatment of dispersible raw material may involve introducing raw material into a riser tube that is perfused by hot gases and thermally treating the raw material with the hot gases. Furthermore, the method may involve feeding a fuel to the riser tube. The fuel may initially dwell in a fuel-conditioning region on a bearing face, where the fuel comes into contact with a part of the hot gas that is mixed with the raw material. Consequently, the (Continued)

fuel is dried and/or at least partially de-gassed and/or at least partially reacted and subsequently transferred into the riser tube.

5 Claims, 4 Drawing Sheets

(51) Int. Cl.
  *F27B 7/20* (2006.01)
  *F27B 7/32* (2006.01)
  *F27B 7/34* (2006.01)
  *C04B 7/00* (2006.01)
  *C04B 7/34* (2006.01)
  *C04B 28/00* (2006.01)
  *C04B 32/00* (2006.01)
  *C04B 9/12* (2006.01)
  *C04B 28/04* (2006.01)
(52) U.S. Cl.
  CPC .......... *F27B 7/34* (2013.01); *F23G 2206/201* (2013.01); *Y02E 20/363* (2013.01)

(56) References Cited

FOREIGN PATENT DOCUMENTS

| DE | 10 2004 045 510 A1 | 3/2006 | |
|----|----|----|----|
| DE | 10 2005 052 753 A1 | 5/2007 | |
| DE | 202007006797 U1 | 9/2008 | |
| DE | 102010008785 A1 | 8/2011 | |
| DE | 10 2012 022 179 A1 | 5/2014 | |
| DE | 102012022179 A1 * | 5/2014 | ............ C04B 7/434 |
| WO | 2012/048159 A2 | 4/2012 | |

OTHER PUBLICATIONS

English language Abstract for DE 195 35 312 A1.
English language Abstract for DE 10 2004 013 883 A1.
English language Abstract for DE 102010008785 A1.
English language machine translation for DE 202007006797 U1.

* cited by examiner

METHOD AND SYSTEM FOR THE THERMAL TREATMENT OF DISPERSIBLE RAW MATERIAL

CROSS REFERENCE TO RELATED APPLICATIONS

This application is a U.S. National Stage Entry of International Patent Application Serial Number PCT/EP2015/070578, filed Sep. 9, 2015, which claims priority to German Patent Application No. 10 2014 113 127.4 filed Sep. 11, 2014, the entire contents of which are incorporated herein by reference.

FIELD

The present disclosure generally relates to methods and systems for the thermal treatment of dispersible raw material, including methods and systems where raw material is introduced into a riser tube that is perfused by hot gas(es) and thermally treated by the hot gas(es).

BACKGROUND

Thermal treatment of dispersible raw material with riser tubes takes place, for example, in the calcination of cement raw material in the production of cement clinker. The thermal energy that is required therefor is provided by fuel which is combusted in a separate combustion chamber that is connected to the riser tube, for example (DE 10 2004 045 510 A1). A similar concept is known from DE 195 35 312 A1 which discloses a reactor, linked to the exhaust line, for generating a combustible gas from waste materials, in particular from old tires. The reactor herein is configured as a gasification reactor and by way of a tertiary air line is connected to the cooler of a cement-clinker system in such a manner that at least a part of the exhaust air of the cooler is useable as a gasification means in the reactor. According to DE 10 2005 052 753 A1, the additional combustion region is configured as underfeed combustion.

In the case of all these variously configured combustion chambers, hot exhaust air of the cooler is utilized for reacting the fuel, wherein the hot gases being created are fed to the calcinator. Raw meal is employed herein for regulating the temperature. These concepts have the disadvantage of a high complexity in terms of apparatuses, this being associated with feeding the hot exhaust air of the cooler and the raw meal by way of separate lines. In many existing systems, the meal feed in particular prevents the technology from being retrofitted, since there is no adequate height differential in order for the raw meal to be able to be fed by means of gravity.

By contrast, WO 2012/048159 A2 pursues another concept in which solid fuel, for example old tires, is combusted directly in the riser tube by means of a pivotable mounting installation. While this method does have the advantage that the complexity in terms of apparatuses relating to the tertiary air lines may be correspondingly reduced, a correspondingly high complexity for the mounting device due to the extremely high temperatures does have to be taken into account.

DETAILED DESCRIPTION

Figure 1:
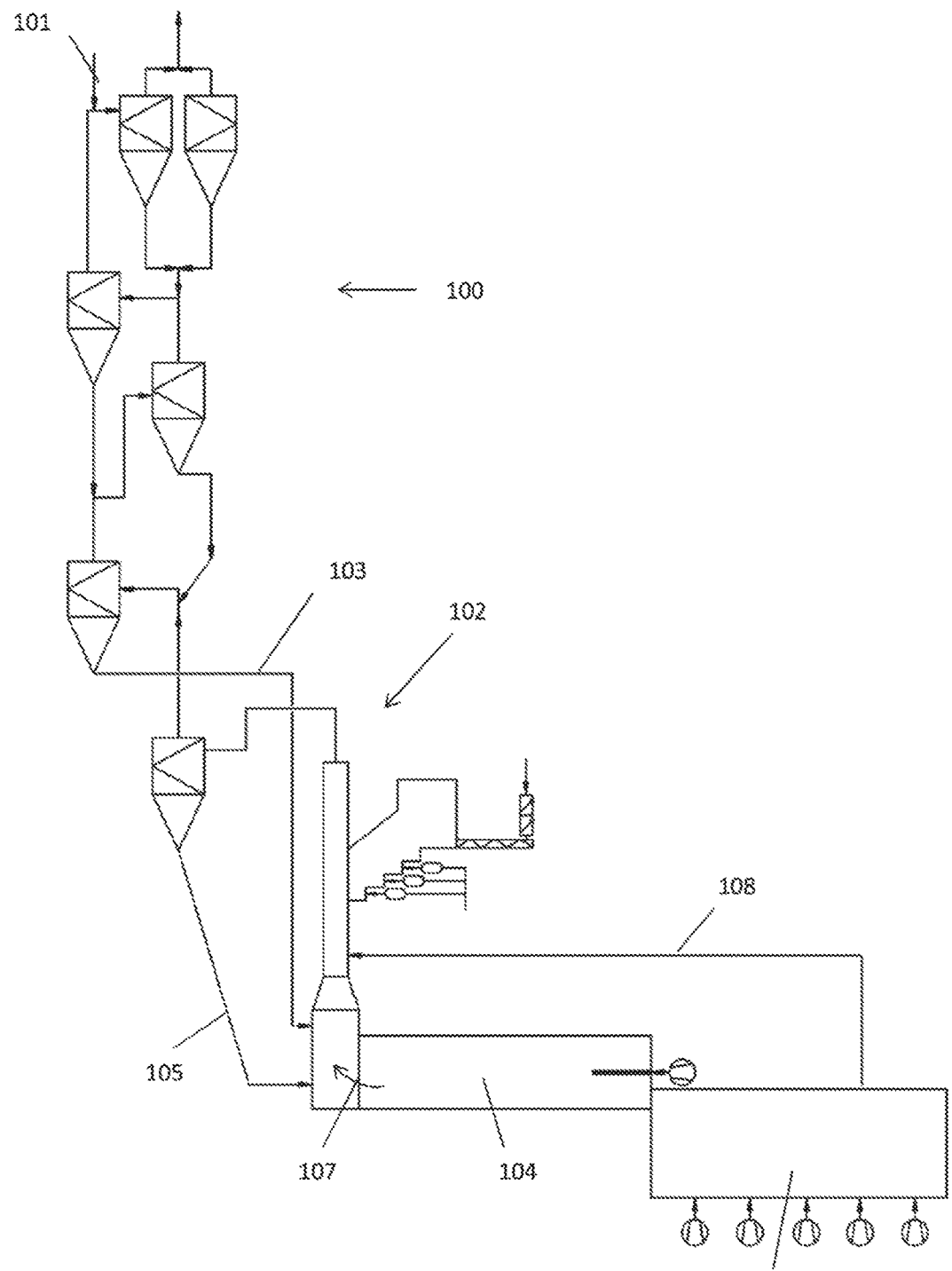
FIG. 1 is a schematic view of an example system for producing cement clinker.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

One example object of the present disclosure concerns reducing the complexity in terms of apparatuses in reacting the fuel for the thermal treatment of dispersible raw material in a riser tube that is perfused by hot gases.

In the case of the method according to the invention for the thermal treatment of dispersible raw material, the raw material is introduced into a riser tube that is perfused by hot gases, and therein is thermally treated by the hot gases. Furthermore, at least one fuel is fed to the riser tube, wherein the fuel initially dwells in a fuel-conditioning region on at least one bearing face, where said fuel comes into contact with a part of the hot gas that is mixed with the raw material and, on account thereof, is dried and/or at least partially de-gassed and/or at least partially reacted, so as to subsequently transfer into the riser tube.

The term "hot gas" is to be understood to refer in particular to flue gases, most preferably flue gases from a furnace or from a heat-treatment system, which may be mixed with further treatment gases.

Therefore, the invention utilizes the hot gases for reacting the fuel, such that the high complexity in terms of apparatuses by way of otherwise correspondingly large dimensioned tertiary air lines, or an additional tertiary air line to the fuel-conditioning region, respectively, can be dispensed with. A further advantage lies in that the temperature regulation in the case of the reaction of the fuel is significantly facilitated by virtue of the lower oxygen content of the hot gases used. The raw meal that is conjointly carried in the hot gases also prevents excessive temperature peaks.

The concept underlying the invention lies in that the fuel in the entire fuel-conditioning region is predominantly, that is to say to at least 50%, dried and/or at least partially de-gassed and/or at least partially reacted by the hot gas that is mixed with the raw material.

The fuel in the fuel-conditioning region herein preferably comes into contact with hot gases which to at least 50%, preferably at least 60%, or at least 70%, or at least 80%, or most preferably to at least 90% are formed by a part of the hot gas that is mixed with the raw material. The remaining part is formed by gas for conveying the fuel along the bearing face, for example, and/or by air that is fed by way of propulsion jet nozzles, wherein the air that is fed by way of propulsion jet nozzles can serve for deflecting the flue gas into the fuel-conditioning region and/or for setting the oxygen content of the hot gases in the region of the fuel-conditioning region.

According to one preferred embodiment, the at least one bearing face of the fuel-conditioning region is disposed in a conditioning chamber which openly leads into the riser tube, wherein a part of the hot gases that are mixed with the raw material is deflected from the riser tube into the conditioning chamber and comes into contact with the fuel. In this way, in particular secondary fuels, or moist fuels, respectively, can also be employed, since the latter in the conditioning chamber are initially dried and at least partially de-gassed and reacted. The fuel herein is preferably fed to the bearing face mechanically or by gravity. The dried and/or at least partially de-gassed fuel is then conveyed mechanically or pneumatically along the bearing face and dropped into the riser tube, or transfers into the riser tube, respectively, where said fuel is then completely reacted or combusted, respectively.

Depending on the oxygen content of the hot gases that perfuse the riser tube, it may be desirable to set the oxygen content of the hot gases that come into contact with the fuel in a targeted manner by adding oxygen-containing gas, so as to optimize the conditioning or the reaction, respectively, of the fuel. This addition of oxygen-containing gas herein can also be used for deflecting the hot gases into the conditioning chamber, so as to, on account thereof, set the quantity of the hot gases that come into contact with the fuel in the fuel-conditioning region in a targeted manner.

It is furthermore desirable for the fuel not to be completely reacted already in the fuel-conditioning region, so as to distribute the energy input by the fuel across the length of the riser tube. Therefore, the fuel at the point of time of being dropped into the riser tube should be reacted by less than 90%, preferably less than 70%, most preferably less than 50%. It is furthermore advantageous for the fuel at the point of time of being dropped into the riser tube to be de-gassed by at least 70%. On account thereof, it is ensured that the fuel which is then entrained by the hot gases in the riser tube can still be completely reacted within the riser tube.

According to one further design embodiment of the invention, it can be provided that the fuel that is located on the bearing face can be extinguished on demand by means of an inert material such as sand or limestone meal, for example.

The system according to the invention for the thermal treatment of dispersible raw material provides a riser tube that is perfused by hot gases, means for adding the raw material, and a fuel-conditioning region, wherein the fuel-conditioning region comprises means for adding fuel, at least one bearing face for the fuel, and means for conveying the fuel along the bearing face and transferring the fuel into the riser tube. The fuel-conditioning region herein is connected to the riser tube in such a manner that a part of the hot gases that are mixed with the raw material reaches the fuel-conditioning region and therein comes into contact with the fuel, the latter on account thereof being dried and/or at least partially de-gassed and/or at least partially reacted.

The means for adding the fuel can comprise spiral conveyors and/or gates and/or pumps and/or tappets and/or chutes and/or cellular wheel sluices and/or a flap system, for example. The means for conveying and transferring the fuel into the riser tube can be formed in the shape of gates or tappets for mechanical conveying, and/or of air-surge apparatuses or blowers for pneumatic conveying. Propulsion jet nozzles can be provided for deflecting that part of the hot gases that is mixed with the raw material into the fuel-conditioning region. These nozzles can be impinged upon with an oxygen-containing gas, so as to set the oxygen content of the hot gases in the fuel-conditioning region in a targeted manner.

In order for sufficient space to be available to the fuel for the reaction of the latter, the ratio of the diameter D of the riser tube to the depth T of the bearing face of the fuel in the fuel-conditioning region should be 5>D/T>1.5, preferably 3>D/T 1.5. The inclination of the bearing face of the fuel in relation to the horizontal should be in the range from +45° to −50°, preferably in the range from 0 to −30°, most preferably in the range from 0 to −10°.

It has furthermore proven advantageous for the bearing face to be formed by at least two successive steps, since mixing or swirling, respectively, of the fuel arises as the latter moves from step to step, and a more rapid reaction is enabled on account thereof. The ratio of the height of the fuel-conditioning region to the depth of the bearing face or the step is preferably between 0.5 and 2, preferably 0.75 and 1.5. Of course, it is also conceivable for the bearing face to be formed by one table and at least one step that adjoins the latter, wherein the length of the individual step is 0.2 to 1, preferably 0.2 to 0.6, times the length of the table. The ratio of the width to the depth of the bearing face is advantageously between 0.5 and 2.5, preferably 1 and 2.

According to one further exemplary embodiment, the fuel-conditioning region is formed by a conditioning chamber that is configured in a portion of the riser tube that is disposed so as to be oblique to the vertical, wherein the at least one bearing face for the fuel is formed by a correspondingly configured wall region of the riser tube. Depending on the configuration of the fuel-conditioning region, deflection means for deflecting that part of the hot gases that is mixed with the raw material into the fuel-conditioning region can be provided. These deflection means can be formed by propulsion jet nozzles, for example.

FIG. 1 shows a system for the production of cement clinker, having a multi-stage preheater 100 for preheating cement raw meal 101, a calcinator 102 for precalcinating the preheated cement raw meal 103, a furnace 104 for burning the precalcinated cement raw meal 105 to form cement clinker, and a cooler 106 for cooling the cement clinker. The hot gases 107 that are created in the furnace 104 perfuse initially the calcinator 102 and subsequently the preheater 100. Furthermore, cooler exhaust air 108 that is created in the cooler 106 is utilized as combustion air in the calcinator 102.

Figure 2:
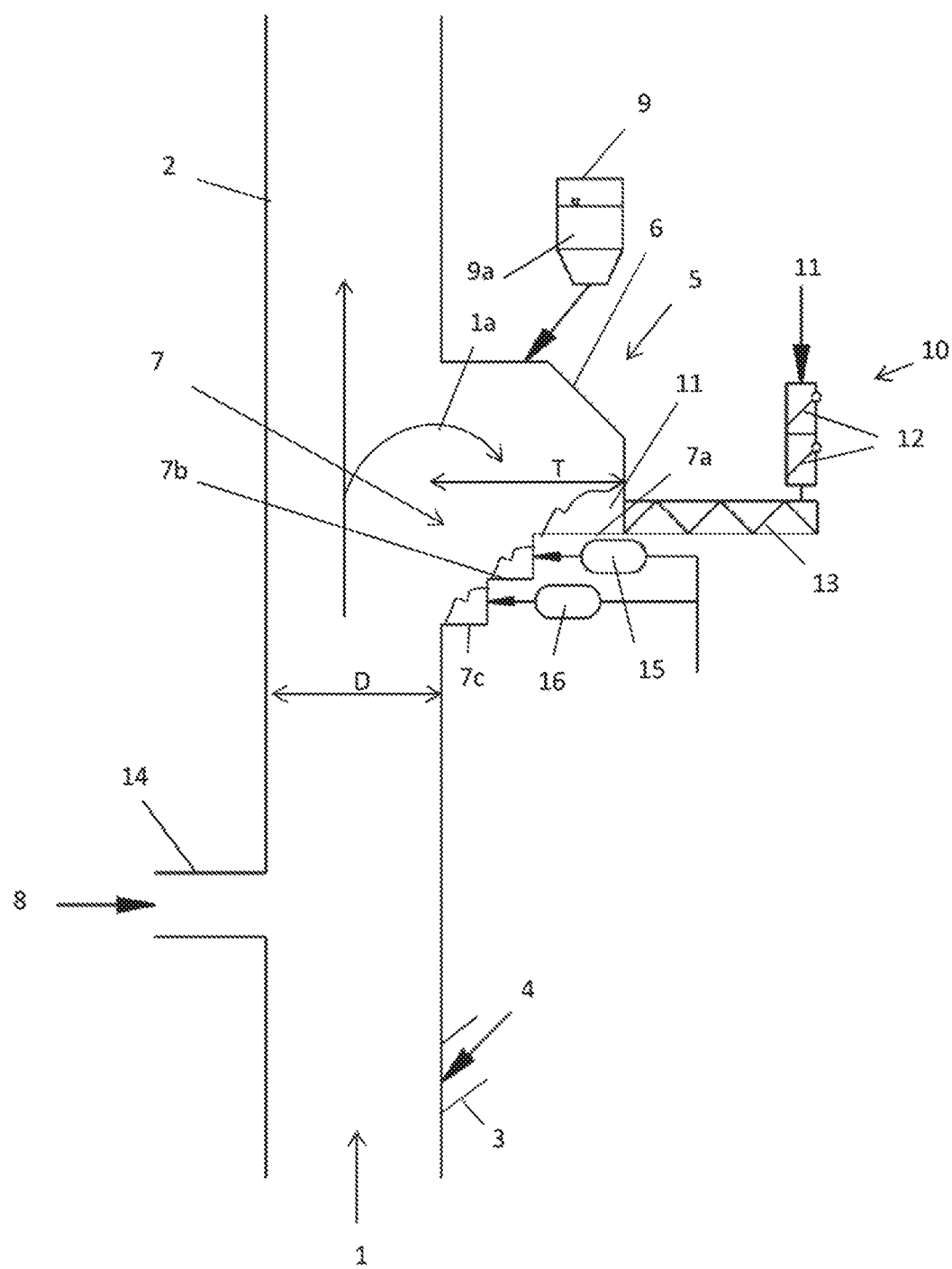
FIG. 2 is a schematic view of an example system for the thermal treatment of dispersible raw material.
Figure 3:
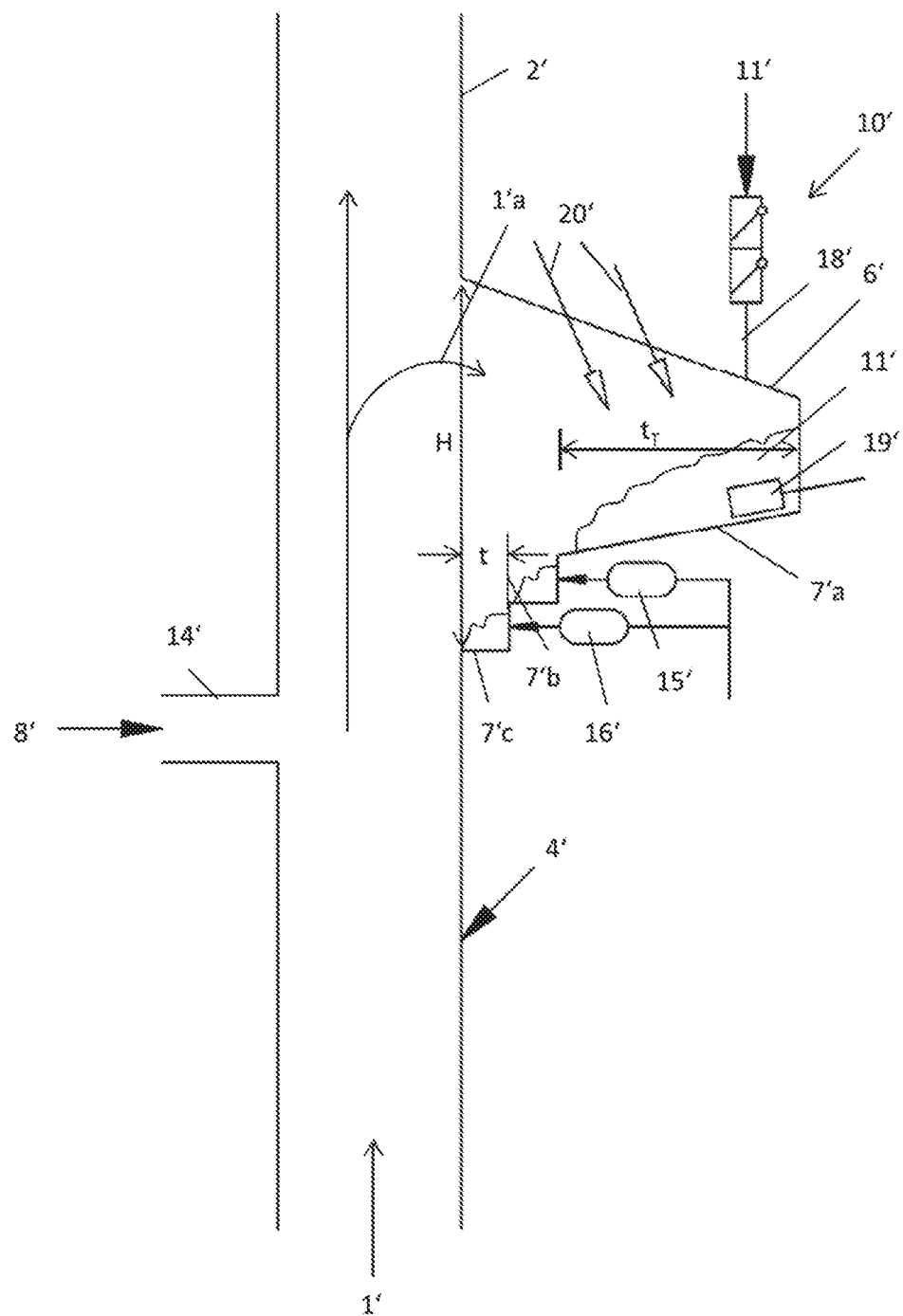
FIG. 3 is a schematic view of another example system for the thermal treatment of dispersible raw material.
Figure 4:
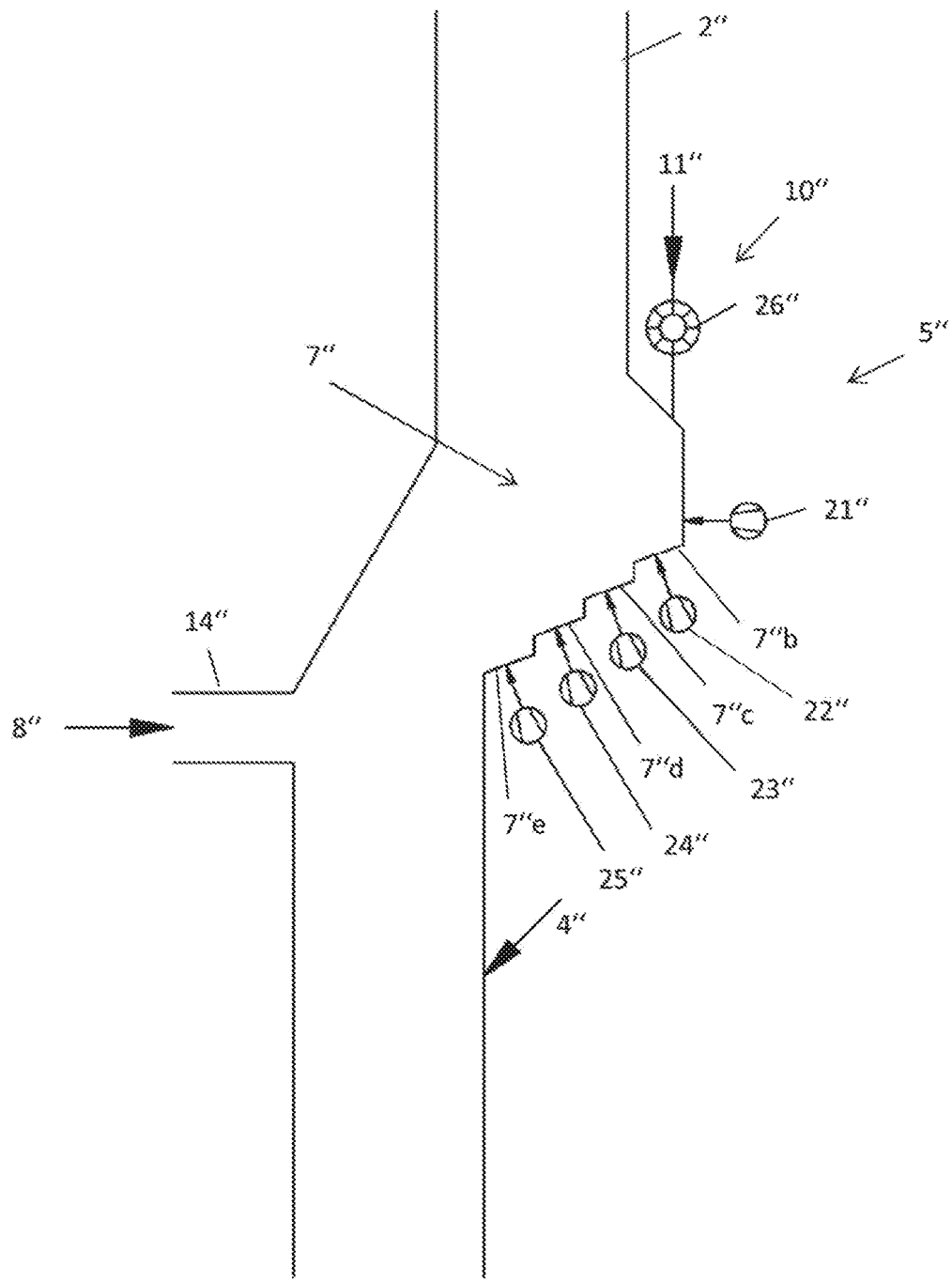
FIG. 4 is a schematic view of a still another example system for the thermal treatment of dispersible raw material.

Various exemplary embodiments for the configuration of the calcinator are shown by means of FIGS. 2 to 4. However, these exemplary embodiments can also relate to further systems for the thermal treatment or the chemical reaction of dispersible raw material, such as to the reduction of ore, for example, and are therefore not limited to a calcinator.

The system for the thermal treatment of dispersible raw material that is illustrated in the FIG. 2 has a riser tube 2 that is perfused by hot gases 1, means 3 for adding the raw meal 4 (in particular preheated cement raw meal 103 of FIG. 1), and a fuel-conditioning region 5 which as a conditioning chamber is attached to the riser tube 2 and openly leads into the riser tube 2. The conditioning chamber has a bearing face 7 for fuel 11, which is formed by one table 7a and two steps 7b, 7c that adjoin the latter in the direction of the riser tube. Furthermore, means 10 for adding fuel 11, which in the exemplary embodiment illustrated comprise pendulum flaps 12 and a worm 13, are provided.

The fuel 11 is pushed onto the bearing face 7 by way of the means 10. The raw material 4 to be thermally treated is fed in a lower region of the riser tube 1 by way of the means 3. Furthermore, oxygen-containing combustion air 8 (for example cooler exhaust air 107, according to FIG. 1) may be fed to the riser tube 2 by way of means 14. The conditioning chamber 6 is connected to the riser tube 2 in such a manner that a part 1a of the hot gases 1 that are mixed with the raw material 4 in the manner of a reverse flow reaches the conditioning chamber 6, and therein comes into contact with the fuel 11 that is dwelling on the bearing face 7, said fuel 11 on account thereof being dried and/or partially de-gassed and/or at least partially reacted. After a sufficient dwell time on the table 7a, the fuel is pushed onto the step 7b in that new fuel is resupplied by way of the spiral conveyor 13. Air-surge apparatuses 15, 16 for transporting the fuel from the step 7b onto the step 7c, or for dropping the fuel from the step 7c into the riser tube 2, respectively, are provided in the region of the steps. However, blowers, gates, or tappets could also be applied. The worm 13 and the air-surge apparatuses 15, 16 by way of a controller (not illustrated in more detail) are activated in a mutually adapted manner such that the fuel dwells in the fuel-conditioning region 5 for a predefined time and therein is reacted in the desired manner.

A bunker 9 for an inert material 9a can furthermore be provided, so as to decelerate or largely bring to a stop the as yet continuing fuel reaction by covering the fuel bed with an inert material (for example sand or limestone meal), for example in the case of sudden stopping of the system.

The fuel that is dropped into the riser tube 2 is entrained by the hot gas and is further reacted or combusted, respectively. The effect of the "reverse flow", in which the part 1a of the hot gases 1 that flow upward in the riser tube 2 reaches the conditioning chamber 6, is in this instance achieved in a particularly effective manner when the ratio of the diameter D of the riser tube 2 to the depth T of the bearing face 7 of the fuel in the fuel-conditioning region 5 is in the range of 5>D/T>1.5, preferably of 3>D/T>1.5.

FIG. 3 shows an exemplary embodiment in which the conditioning chamber 6' again openly leads into the riser tube 2'. The means 10' for adding the fuel are again formed by pendulum flaps 12', 13' and a chute 18', such that the fuel can be added by means of gravity. While the table 7a of the bearing face 7 of the first exemplary embodiment was aligned horizontally, the table 7'a of the bearing face 7' of the exemplary embodiment according to FIG. 2 is inclined, wherein again two steps 7'b, 7'c which here are configured horizontally are disposed adjacent to the table 7'a, wherein, however, steps with inclined bearing faces are also conceivable. The angle of inclination herein can be in the range from −45° to +50°, preferably in the range from 0 to −30°, most preferably in the range from 0 to −10°. The inclination should expediently be of a magnitude that the fuel does not slide downward in a self-acting manner.

Furthermore, means 19' for conveying the fuel 11' along the bearing face 7' are provided in the exemplary embodiment illustrated, which means 19' here are formed by a gate. Air-surge apparatuses 15', 16' are again provided in the region of the steps. This oblique arrangement of the table 7'a has the advantage that conveying of the fuel 11' is facilitated. Moreover, the deflection of a part 1'a of the hot gas 1' that is mixed with the raw material 4' can be facilitated by this geometry of the conditioning chamber 6'. In order for this deflection to be further facilitated, propulsion jet nozzles 20' which are aligned in such a manner that the latter induct a part of the hot gases 1' that are blended with the raw material 4' into the conditioning chamber 6' are provided in the region of the conditioning chamber 6.

A particularly efficient reaction of the fuel in the region of the fuel-conditioning region 5, 5' results when the ratio of the height H of the fuel-conditioning region to the depth T of the bearing face is between 0.5 and 2, preferably 0.75 and 1.5. If the bearing face 7, 7', as is the case with the two exemplary embodiments, is formed by one table 7a, 7'a and at least one step 7b, 7c, 7'b, 7'c adjoining the latter, the depth t of the step is preferably 0.2 to 1 times, preferably 0.2 to 0.6 times, the depth $t_T$ of the table. A value between 0.5 and 2.5, preferably 1 and 2, has proven advantageous for the ratio of the width to the depth T of the bearing face 7, 7'.

In the case of the exemplary embodiment according to FIG. 4, the fuel-conditioning region 5" is formed by a conditioning chamber 6" that is disposed in a portion of the riser tube 2" that is disposed so as to be oblique to the vertical, wherein the bearing face 7" for the fuel is at least partially formed by an outwardly offset wall region of the riser tube 2", said wall region in the exemplary embodiment illustrated being formed only by steps 7"b, 7"c, 7"d, 7"e that are configured so as to be inclined. Due to the inclination of the steps, simple blowers are sufficient for conveying the fuel. The means 10' for adding the fuel 11" here are formed by a cellular wheel sluice.

In the context of the invention, the design embodiments shown in the three exemplary embodiments, such as the design embodiment of the bearing face, for example, or the type of feeding and conveying of the fuel, can be arbitrarily combined with one another.

What is claimed is:

1. A method for thermal treatment of dispersible raw material, the method comprising:
   introducing raw material into a riser tube that is perfused by hot gases;
   thermally treating the raw material in the riser tube with the hot gases;
   feeding a fuel into a fuel-conditioning region and onto a bearing face disposed in a conditioning chamber that leads into the riser tube, wherein at least 50% of hot gases that come into contact with the fuel is formed by a part of the hot gases that are mixed with the raw material and deflected into the conditioning chamber, whereby as a result the fuel is at least one of
   dried,
   partially or completely de-gassed, or
   partially or completely reacted; and
   transferring the fuel into the riser tube.

2. The method of claim 1 wherein the fuel is fed onto the bearing face mechanically or by gravity.

3. The method of claim 1 further comprising conveying the dried, partially or completely de-gassed, or partially or completely reacted fuel mechanically or pneumatically along the bearing face before being transferred into the riser tube.

4. The method of claim 1 further comprising setting in a targeted manner an amount of the hot gases that is mixed with the raw material and comes into contact with the fuel in the fuel-conditioning region by adding an oxygen-containing gas.

5. The method of claim 1 further comprising decelerating or completely stopping a combustion reaction of the fuel on the bearing face by using an inert material.

* * * * *